United States Patent [19]

Asanuma et al.

[11] 4,204,754
[45] May 27, 1980

[54] FORMAT FILM SELECTING DEVICE

[75] Inventors: Katsumi Asanuma, Tokyo; Shigeru Mogi, Yokohama, both of Japan

[73] Assignee: Fuji Photo Film Co., Ltd., Kanagawa, Japan

[21] Appl. No.: 953,359

[22] Filed: Oct. 23, 1978

[30] Foreign Application Priority Data

Oct. 25, 1977 [JP] Japan ................................ 52/127997

[51] Int. Cl.² ...................... G03B 23/00; G03B 21/02
[52] U.S. Cl. .................................. 353/116; 353/118; 353/25; 353/30; 355/40
[58] Field of Search ................. 353/25, 103, 114, 115, 353/116, 118, 120, 30, 36, 37; 355/40, 41, 42, 43; 40/367, 366

[56] References Cited

U.S. PATENT DOCUMENTS

| | | | |
|---|---|---|---|
| 3,110,217 | 11/1963 | Millner et al. | 353/116 |
| 3,171,222 | 3/1965 | Sakaki et al. | 353/118 |
| 3,486,818 | 12/1969 | Hoppmann et al. | 353/118 |
| 3,623,803 | 11/1971 | Ganz | 353/103 |
| 3,644,028 | 2/1972 | Rube | 353/103 |
| 3,721,494 | 3/1973 | Stine | 353/103 |
| 4,053,215 | 10/1977 | Haning et al. | 353/118 |
| 4,059,352 | 11/1977 | Bar et al. | 353/103 |

FOREIGN PATENT DOCUMENTS 1066018  4/1967  United Kingdom .................... 353/103

Primary Examiner—John W. Shepperd

[57] ABSTRACT

A number of format films carrying fixed information to be recorded together with computer output information given by a magnetic tape are vertically stacked in a cassette. The cassette is supported on a vertically movable cassette support. At a predetermined level which is of the same level as a projection station where the format film is brought and the image of the film is projected there is provided a format film gripping device. The format film gripping device has a fixed arm and a swingable arm which are opened at the cassette and closed to grip one of the format films in the cassette when the gripping device is driven to take out one of the format films from the cassette and brings the taken out format film to the projection station. The vertically movable cassette support is moved up and down stepwisely to selectively bring one of the format films to be projected to the predetermined level where the format film is taken out of the cassette and brought to the projection station.

5 Claims, 7 Drawing Figures

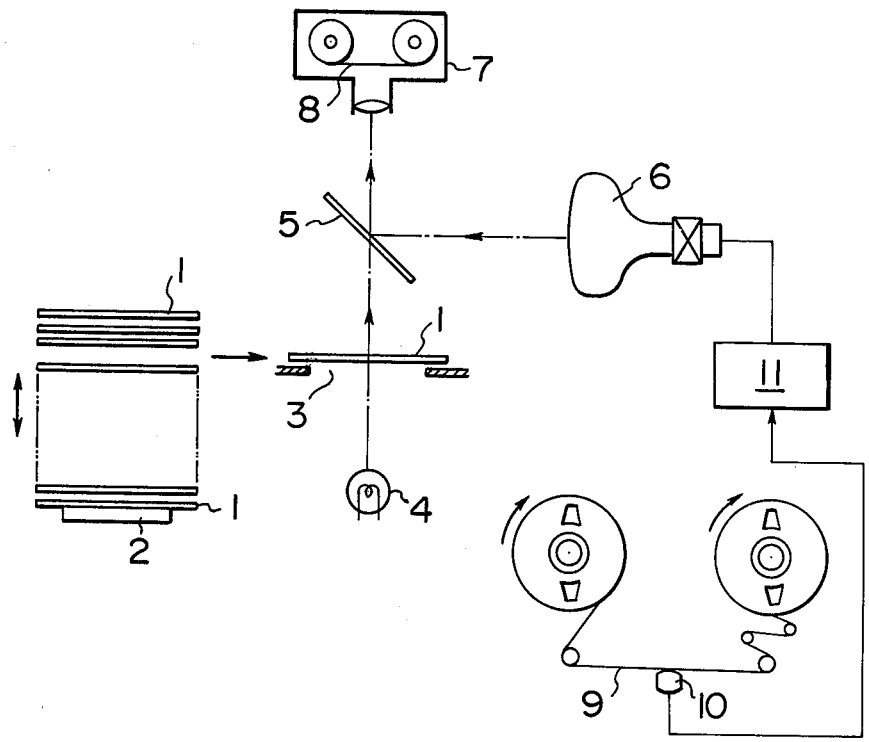

FORMAT FILM SELECTING DEVICE

BACKGROUND OF THE INVENTION

1. Field of the Invention

This invention relates to an information retrieval device, and more particularly to a device for selecting and bringing to a projection station a transparency from among a number of transparencies which carry fixed information and are stored in a vertically stacked form.

2. Description of the Prior Art

It has been known in the art to display a computer output on a cathode ray tube and record the displayed output on a microfilm. The device used for this purpose is called Computer Output Microfilmer, which will hereinbelow be referred to as COM. The COM is practically very convenient since the recorded output can be long stored, easily duplicated, easily distributed and easily retrieved. For making the record of information in good form, the output information displayed on the cathode ray tube is combined with an image of fixed information such as items, lines of a frame of a table etc. The fixed information is recorded in advance on a transparency and the image of the transparency is optically combined with the displayed output information by use of a semi-transparent mirror or the like. The combined information is photographed by a microcamera. The transparency is usually in the form of a lithographic plate fixed to a metal mount. This transparency will hereinbelow be referred to simply as "format film".

In the conventional COM, it has been known to use a rotatable turret on which a number of format films are mounted and selectively brought to a projection station. The turret type format film holder is disadvantageous in that the format films are radially arranged and accordingly occupy a large space and need fine position adjustment of the turret for precisely bringing the format film to the predetermined projection position.

SUMMARY OF THE INVENTION

The primary object of the present invention is therefore to provide a device for selectively bringing a format film to a projection station in a COM which is compact in size.

Another object of the present invention is to provide a device for selectively bringing a format film to a projection station in a COM in which the format film can be precisely brought to the projection station.

The format film selecting device in accordance with the present invention for selecting a format film from among a number of format films stored and bringing the selected format film precisely to a projection station is characterized in that the format films are stored in a form of a vertical stack and the selected format film is moved horizontally to the projection station. When selecting the format film, the vertically stacked format films are moved in the vertical direction to bring one of the format films to a predetermined level and then the selected format is taken out of the stack and moved to the projection station in a horizontal plane by means of a grip means.

The grip means is for instance a pair of arms for gripping the selected format film, transparency in a metal mount, at opposite sides thereof, and is retracted from the gripping position when the format films are moved vertically for selection. When taking out a format film, the grip means is closed and put into contact with the opposite sides of the format film to move it to the projection station.

It will be understood by those skilled in the art that the format film selecting device in accordance with the present invention is not only applicable to a COM but also adaptable to an ordinary slide projector.

BRIEF DESCRIPTION OF THE DRAWING

FIG. 1 is an explanatory schematic view showing a COM system to which the present invention is applicable, FIG. 2 is a fragmentary plan view showing a part of a table photographed by a COM.

DESCRIPTION OF THE PREFERRED EMBODIMENT

Figure 3:
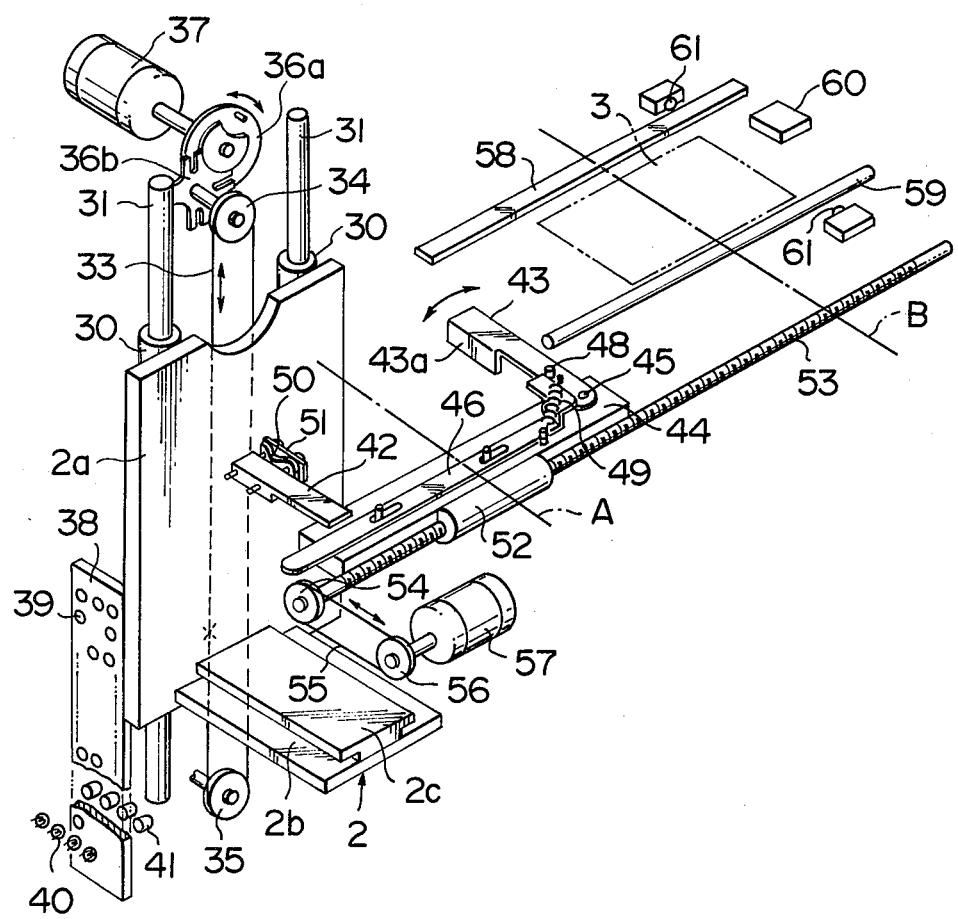
FIG. 3 is a perspective view showing an embodiment of the device in accordance with the present invention.

Now the present invention will be described in detail with reference to a preferred embodiment thereof referring to the accompanying drawings.

FIG. 1 shows schematically a COM to which the present invention is applicable. A format film 1 is retained in a film cassette in a vertical stack and is moved up and down vertically by a cassette support 2 to select a format film 1. The selected format film 1 is brought to a gate 3 by means of a grip means hereinafter described. Under the gate 3 is provided a light source 4 for illuminating the image on the format film 1 so that the image may be photographed by a microcamera 7 on a film 8 therein together with and combined with the information displayed on a cathode ray tube 6. The film 8 in the microcamera 7 is a roll microfilm which is processed as it is or after cut into sheet films or into a film having a length.

The cathode ray tube 6 displays the information memorized in a magnetic tape 9 and reproduced by a magnetic head 10 and transmitted to a controller 11.

The format films 1 are properly selected when put into use in combination with the sort of information displayed on the cathode ray tube 6. For instance, when the information is concerned with wages, a format film carrying a format of a table of a wage specification is selected, and when the information is concerned with patent applications, a format film carrying a format of a table of patent applications is selected.

FIG. 2 shows an example of a microfilm obtained in accordance with the present invention. The format film 1 carries a title 20, No. 21, items of "country" 22, "filing date" 23, "title" 24 and frame lines 25. On the other hand, on the cathode ray tube 6 is displayed computer output information such as names of countries 26, filing dates 27 etc. The fixed information carried by the format film 1 and the output information are combined into a complete table as shown in FIG. 2 and recorded on the microfilm 8.

Now the structure and operation of the device in accordance with an embodiment of the present invention will be described referring to FIGS. 3 to 5. A cassette support 2 comprises a vertical plate 2a and a horizontal plate 2b connected with each other to form an L-shaped support 2. The vertical plate 2a is provided with a pair of slide sleeves 30 fixed thereto in parallel with each other at both side ends. The vertical plate 2a is slidably mounted on a pair of columns 31 with which said slide sleeves 30 are slidably engaged. The horizontal plate 2b is used for supporting a cassette as shown in FIG. 6 and is provided with a foot portion 2c thereon. The foot portion 2c is to be engaged with a shoe formed on the lower face of the bottom plate of the cassette to hold the cassette on the horizontal plate 2b.

Figure 4:
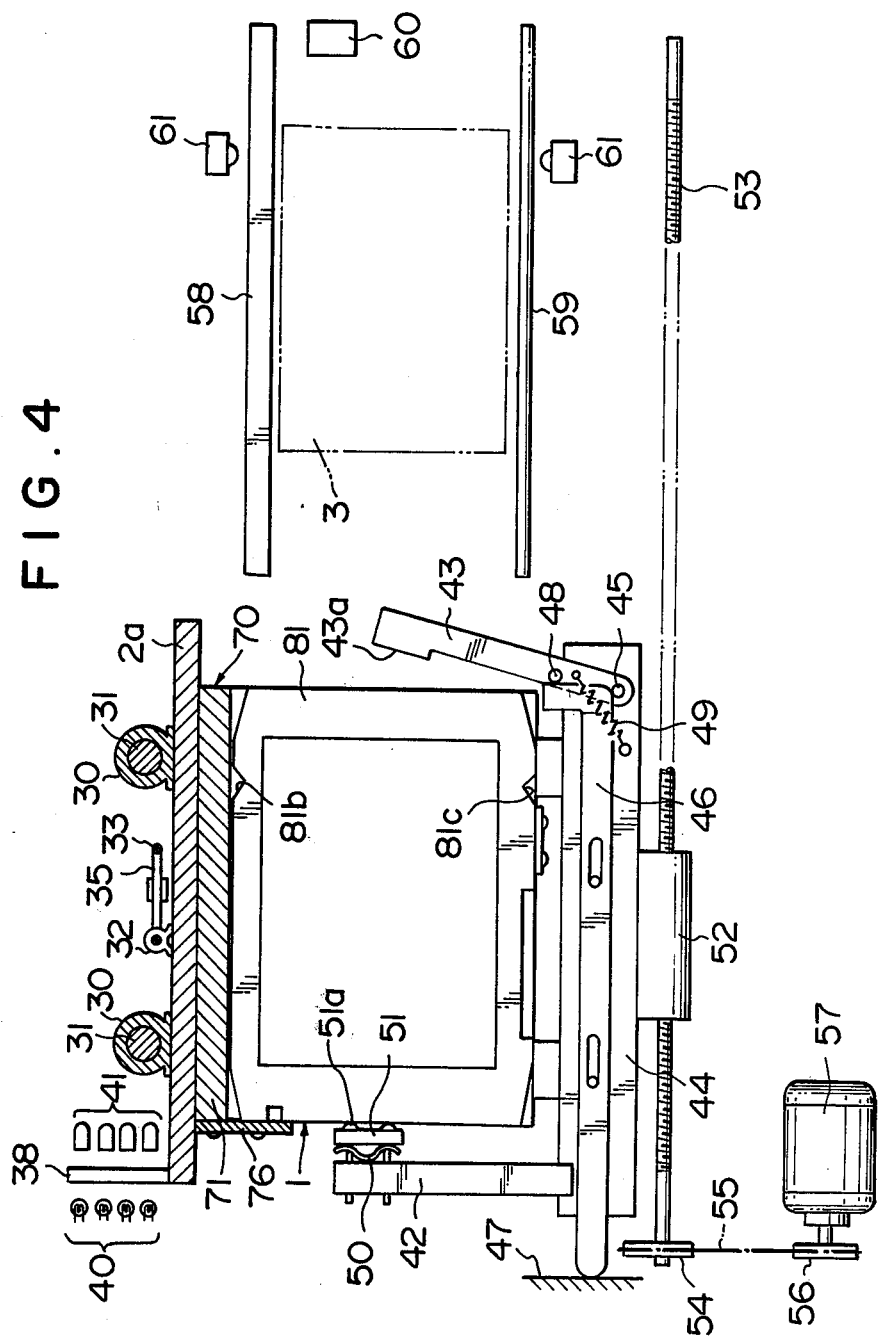
FIG. 4 is a plan view of the device of this invention in which a grip means is at a gripping position.

On the back face of said vertical plate 2a is fixed a part of a wire 33 by means of a fixture 32 (FIG. 4). The wire 33 is tensioned around a pair of pulleys 34 and 35 located above and below the vertical plate 2a. As the pulley 34 rotates, the wire 33 runs around the pulleys and the cassette support 2 is moved vertically up and down.

The pulley 34 is intermittently rotated by a Geneva gear mechanism consisting of a disc 36a and a Geneva gear 36b. When the disc 36a is rotated by one turn by a motor 37 connected therewith, the Geneva gear 36b is rotated by ¼ turn. This is intermittently repeated so that the pulley 34 is rotated intermittently as the motor 37 rotates continuously. Thus, the cassette support 2 is vertically moved stepwise, in which one step corresponds to one format film in the cassette.

With this arrangement, the motor 37 may be controlled only so that the motor 37 is stopped while the motor is in the position corresponding to ¾ of one turn. Therefore, the control of the motor is easily conducted. Of course, the intermittent rotating mechanism may be omitted and the pulley 34 may be directly rotated by the motor 37 or a step motor.

On one side of the vertical plate 2a, a position detecting plate 38 is provided which detects and indicates the vertical position of the cassette support 2. The position detecting plate 38 is provided with a number of through holes 39 arranged at vertical intervals equal to the intervals of the vertically stacked format films in the cassette and arranged to indicate a code indicative of the vertical position of the cassette, namely the number of the format film. The code indicated by the through holes 39 is detected or read by a light source group 40 and a photodetector group 41 horizontally arranged at intervals equal to the horizontal intervals of the through holes 39. When the code indicative of the desired position of the film cassette is detected by the detector group 41 which means that the desired format film is in the position or level A in alignment of the projection station, the motor 37 is stopped and a brake is actuated to stop the cassette.

Figure 5:
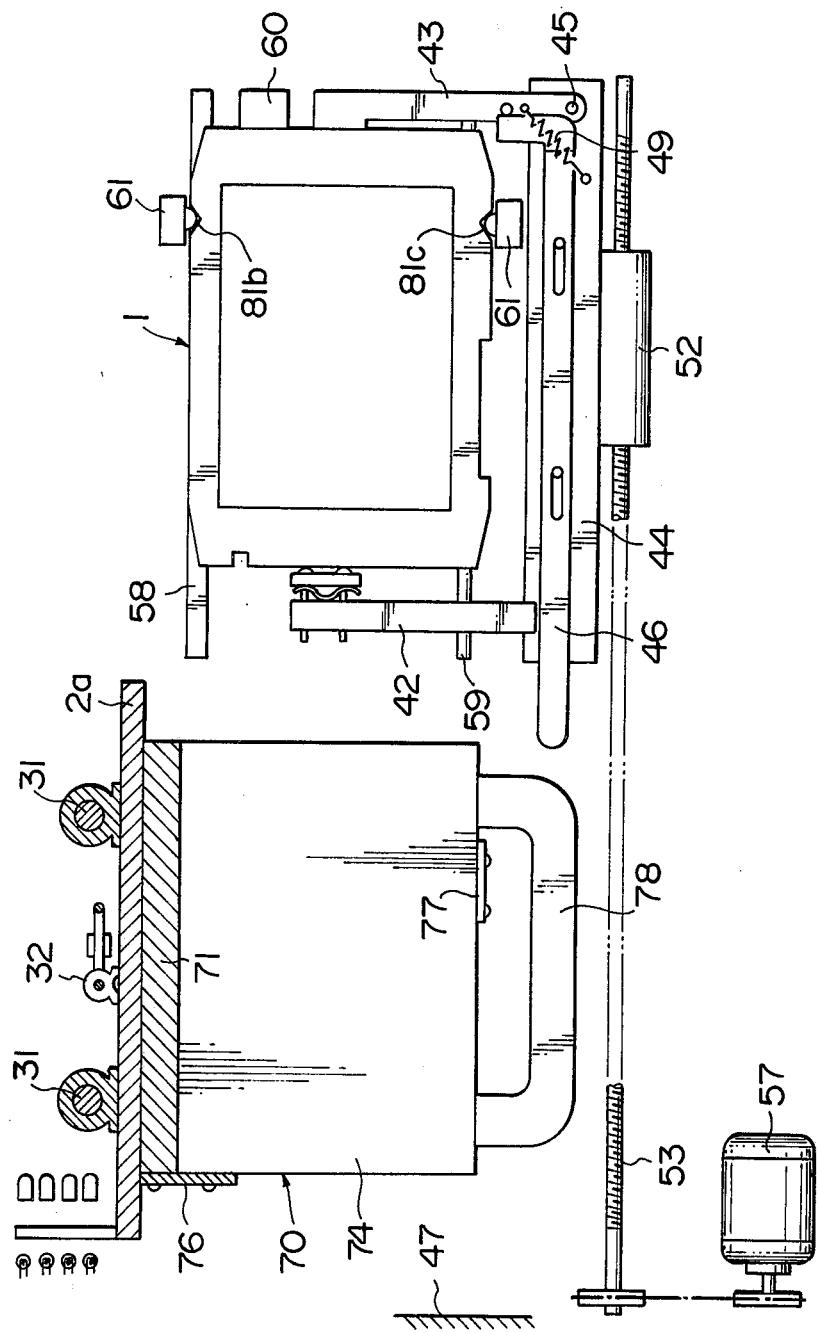
FIG. 5 is a plan view similar to FIG. 4 in which a grip means is at a projection station.
Figure 6:
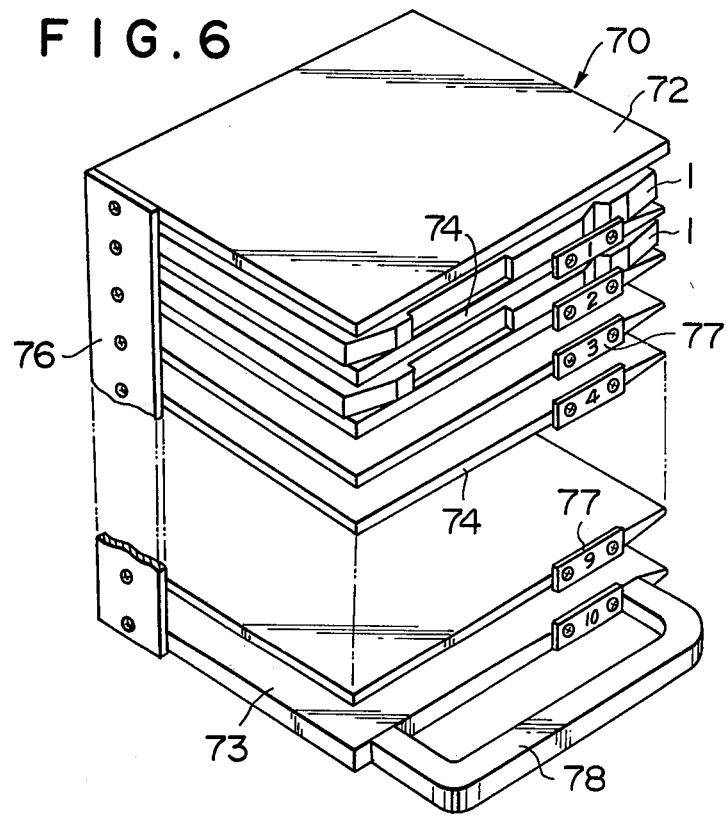
FIG. 6 is a perspective view of a format film cassette in which a number of format films are vertically stacked.

The format film 1 on said level A is gripped by a fixed arm 42 and a movable arm 43 and taken out of the cassette as shown in FIGS. 4 and 5. Thus, the format film 1 is brought to a projection station B. The arms 42 and 43 are mounted on a movable stage 44. The movable arm 43 is pivotally mounted on the stage 44 at a pivot 45 and has a pin 48 on which a slidable bar 46 abuts as shown in FIG. 4. The slidable bar 46 abuts at one end on the pin 48 and abuts at the other end on a wall 47 of the device so that the movable 43 is moved to an open position when the format film 1 is in the cassette and the left end of the slidable bar 46 abuts on the wall. As the movable stage 44 is moved to the right and the slidable bar 46 is separated from the wall 47, the movable arm 43 is closed to hold a format film 1 being pulled by a tension spring 49. Thus, a format film 1 is taken out of the cassette.

In order that the format film 1 may be firmly gripped, the fixed arm 42 is provided with a contact member 51 spring supported by a spring 50. The contact member 51 is provided on the surface thereof with a pair of contact projections 51a, and the movable arm 43 is provided with a bent portion 43a, whereby the format film 1 is gripped between the contact member 51 and the bent portion 43a.

The movable stage 44 is provided with a half nut 52 which is screw engaged with a feed screw rod 53. The feed screw rod 53 is driven by a pulley 54, a belt 55 and a pulley 56 which are in turn driven by a motor 57. Thus, a horizontal drive means is constituted. The motor 57 is stopped when the movable stage 44 has reached the left and right end positions, which is detected by a microswitch (not shown).

The format film 1 taken out the cassette is transferred from the cassette to the projection position B guided by a flat rail 58 and a guide bar 59. When the format film 1 has reached to the projection position B, the film 1 abuts on a stopper 60 and gripped between a pair of clip stoppers 61 as shown in FIG. 5. As this position, the clip stoppers 61 are engaged with notches 81b and 81c on the side edges of the metal mount 81 of the format film 1.

FIG. 6 shows a cassette 70 to retain the stack of format films 1. The cassette 70 has a top plate 72 and a bottom plate 73 at the upper end and lower end of a back plate 71 (see FIG. 4). A number of support plates 74 are provided in parallel between the stack of format films 1. The support plates 74 are provided at equal intervals and are fixed to a side plate 76 which is secured to the top plate 72 and the bottom plate 73. The right side edge of the support plate 74 and of the bottom plate 73 is tapered to facilitate insertion of the format films 1. The support plate 74 and the bottom plate 73 are provided at the front edge thereof with a stopper 77 for preventing the format films 1 from falling out of the cassette from the front side. The upper edge of the stopper 77 and the lower face of the support plate 74 above it are spaced to allow said fixed arm 42 to pass therethrough. The back plate 71 is further provided with a number of grooves to receive the rear end of the support plates 74. The bottom plate 73 is provided on the lower face thereof with a shoe (not shown) to be engaged with said foot portion 2c provided on the horizontal plate 2b. Further, the bottom plate 73 is provided on the front face thereof with a grip portion 78 so as to facilitate the take out of the cassette 70 from the cassette support 2.

Figure 7:
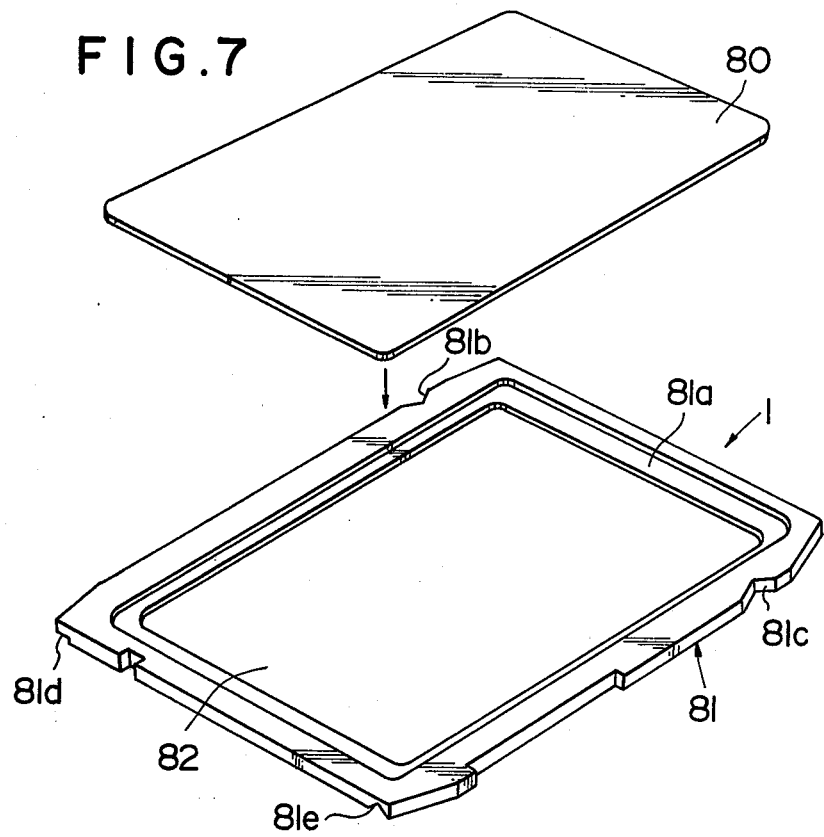
FIG. 7 is a perspective view showing a lith plate and a metal mount for supporting the same to constitute a format film handled in this invention.

FIG. 7 shows a format film 1 in detail. The format film 1 is composed of a lithographic plate 80 carrying fixed information such as items, frame lines and so forth and a metal mount 81 to support the lithographic plate 80. The metal mount 81 has a rectangular shape and has a rectangular opening or aperture 82. The metal mount 81 is provided around the aperture 82 with a stepped portion 81a to receive the lithographic plate 80. The front face and the rear face of the metal mount 81 are tapered at both ends to facilitate insertion and take out of the format film 1 into and from the cassette 70. The front face and the rear face of the metal mount 81 is further provided with notches 81c and 81b respectively to be engaged with said clip stoppers 61 when the format film 1 is moved to the gate 3 by said arms 42 and 43 so that the format film 1 is stationarily held there.

On the lower face of said metal mount 81 are provided a groove 81d longitudinally extending along the rear face of the metal mount 81 and a V-shaped groove 81e longitudinally extending in parallel to said groove 81d. The first groove 81d has a rectangular cross section and is engaged with said flat rail 58 and the V-shaped groove 81e is engaged with said guide bar 59.

Now the operation of the above described embodiment of the present invention will be described in detail. Format films 1 are put in the cassette 70 in a predetermined order. The cassette 70 is placed on the cassette support 2. The identification number of the format film 1 to be used is recorded in a magnetic tape 9 according to the sort of the information recorded. After the identification number has been read out, the motor 37 is rotated in one direction. As the motor 37 rotates, the wire 33 is driven intermittently. By the intermittently driven wire 33 the cassette support 2 is stepwisely moved up or down guided along the pair of columns 31. Since the position detecting plate 38 is also moved together with the cassette support 2. Accordingly, the code indicated by the through holes 39 provided in the position detecting plate 38 is read by the light source group 40 and the photodetector group 41. When the read out code coincides with the designated code recorded in the magnetic tape 9, the motor 37 is stopped. At this stage, the desired format film 1 is at the level A to be taken out of the cassette 70.

After the desired format film 1 has been brought to the level A, the motor 57 starts to drive the feed screw rod 53 and accordingly the movable stage 44 moves to the right in FIGS. 3 to 5. As the movable stage 44 moves to the right, an end of the slidable bar 46 is separated from the wall 47 and the movable arm 43 is swung counterclockwise by the spring 49. By this movement of the movable arm 43 the format film 1 is gripped by the arms 42 and 43. Then, the format film 1 is moved to the right from the cassette 70 to the projection position B. The fixed arm 42 pushes the format film 1 out of the cassette 70 between the support plates 74. Thus, the format film 1 is moved to the projection position guided along the flat rail 58 and the guide bar 59 until the format film 1 is gripped by the clip stopper 61 and abuts on the stopper 60. At this position, as shown in FIG. 5, the movable stage 44 pushes a microswitch (not shown) to stop the motor 57. Thus, the format film 1 is brought to the projection position B where the lithographic plate 80 is located on the gate 3 and the image carried by the lithographic plate 80 is photographed by the microcamera 7.

After the fixed information on the lithographic plate 80 has been photographed by the microcamera 7, the motor 57 starts to rotate reversely and the format film 1 is brought back into the cassette 70 by arms 42 and 43. When the format film 1 has reached the cassette 70, the end of the slidable bar 46 abuts on the wall 47 and moves to the right to open the movable arm 43 clockwise as shown in FIG. 4. Thus, the format film 1 is released from the arms 42 and 43 and the cassette 70 is allowed to move up and down to bring a different format film 1 to the level A.

We claim:

1. A device for selectively bringing a format film to a projection station in an image projection system comprising in combination,
   a cassette containing vertically arranged format films, each format film comprising a mount having guiding means and locating means thereon,
   a cassette support means for supporting said cassette,
   cassette vertically moving means for moving the cassette support means up and down,
   a format film gripping means movable between the projection station and a format film in the cassette which is located at the same level as the projection station, said format film gripping means releasing said format film in the cassette and holding the same when the format film gripping means starts to move from the cassette to the projection station,
   format film horizontally moving means for moving the format film in the horizontal direction, and guiding means and locating means on said device for respectively cooperating with the guiding means and locating means on the format film,
   whereby the cassette vertically moving means moves the cassette support means in the vertical direction to select the format film to be brought to the projection station, and the format film horizontally moving means moves the selected format film, guided by said guiding means, to the projection station in which it is accurately positioned by said locating means.

2. A device as defined in claim 1 wherein said cassette vertically moving means comprises a Geneva gear mechanism for moving the cassette support means vertically intermittently.

3. A device as defined in claim 1 wherein said format film gripping means comprises a fixed arm and a swingable arm.

4. A device as defined in claim 3 wherein there is provided a slidable member and a fixed member, said swingable arm being engaged with said slidable member to be swung to a releasing position to release the format film in response to slide of the slidable member caused by said slidable member abutting said fixed member where the gripping means comes to the cassette.

5. A device for selectively bringing a format film to a projection station in an image projection system comprising in combination,
   a cassette containing vertically arranged format films,
   a cassette support means for supporting said cassette,
   cassette vertically moving means for moving the cassette support means up and down,
   a format film gripping means comprising a fixed arm and a swingable arm movable between the projection station and a format film in the cassette which is located at the same level as the projection station,
   a slidable member and a fixed member, said swingable arm being engaged with said slidable member to be swung to a releasing position to release the format film in response to slide of the slidable member caused by said slidable member abutting said fixed member when the gripping means comes to the cassette, and said gripping means holding said format film when the gripping means starts to move from the cassette to the projection station, and
   format film horizontally moving means for moving the format film in the horizontal direction,
   whereby the cassette vertically moving means moves the cassette support means in the vertical direction to select the format film to be brought to the projection station, and the format film horizontally moving means moves the selected format film to the projection station.

* * * * *